(12) United States Patent
Grötzinger

(10) Patent No.: US 10,753,910 B2
(45) Date of Patent: Aug. 25, 2020

(54) PROCESS AND DEVICE FOR THE ANALYSIS OF THE ACOUSTIC CHARACTERISTIC OF AN EXHAUST GAS FLAP

(71) Applicant: Eberspächer Exhaust Technology GmbH & Co. KG, Neunkirchen (DE)

(72) Inventor: Sven Grötzinger, Nürtingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 16/180,444

(22) Filed: Nov. 5, 2018

(65) Prior Publication Data
US 2019/0137455 A1 May 9, 2019

(30) Foreign Application Priority Data

Nov. 6, 2017 (DE) .......... 10 2017 125 801
Dec. 8, 2017 (DE) .......... 10 2017 129 234

(51) Int. Cl.
| | |
|---|---|
| G01N 29/46 | (2006.01) |
| G01N 29/34 | (2006.01) |
| G01N 29/44 | (2006.01) |
| G01N 29/14 | (2006.01) |
| G01N 29/42 | (2006.01) |
| F01N 11/00 | (2006.01) |
| G01N 29/12 | (2006.01) |

(52) U.S. Cl.
CPC ............ *G01N 29/46* (2013.01); *F01N 11/00* (2013.01); *G01N 29/12* (2013.01); *G01N 29/14* (2013.01); *G01N 29/348* (2013.01); *G01N 29/42* (2013.01); *G01N 29/4436* (2013.01); *F01N 2240/36* (2013.01); *F01N 2560/12* (2013.01)

(58) Field of Classification Search
CPC ........ G01N 29/46; G01N 29/42; G01N 29/14; G01N 29/4436; G01N 29/348; G01N 29/12; F01N 11/00; F01N 2240/36
See application file for complete search history.

(56) References Cited

U.S. PATENT DOCUMENTS 7,155,333 B1 * 12/2006 Abram ................ F01N 1/165
701/111

FOREIGN PATENT DOCUMENTS

| CN | 102 175 299 A | 9/2011 |
|---|---|---|
| DE | 101 44 674 A1 | 4/2003 |
| DE | 10 2006 054 603 A1 | 5/2008 |
| DE | 11 2006 002343 T5 | 11/2008 |
| DE | 10 2015 221 627 A1 | 5/2017 |

* cited by examiner

*Primary Examiner* — David Z Huang
(74) *Attorney, Agent, or Firm* — McGlew and Tuttle, P.C.

(57) ABSTRACT

A process for the analysis of the acoustic characteristic of an exhaust gas flap (10) for an exhaust system of an internal combustion engine, wherein the exhaust gas flap (10) includes a flap diaphragm (14), which is adjustable in a flap body (12). A measurement noise is applied to the exhaust gas flap (10). A disturbing noises originating at the exhaust gas flap (10) is detected and a disturbing noise time course (50) is generated. A disturbing noise frequency course (56) is generated based on the disturbing noise time course (50). The disturbing noise frequency course (56) is compared with a reference disturbing noise frequency course (58). The acoustic quality of the exhaust gas flap (10) is evaluated based on the comparison.

16 Claims, 3 Drawing Sheets

PROCESS AND DEVICE FOR THE ANALYSIS OF THE ACOUSTIC CHARACTERISTIC OF AN EXHAUST GAS FLAP

CROSS REFERENCE TO RELATED APPLICATIONS

This application claims the benefit of priority under 35 U.S.C. § 119 of German Applications 10 2017 125 801.9, filed Nov. 6, 2017 and 10 2017 129 234.9, filed Dec. 8, 2017, the entire contents of which are incorporated herein by reference.

TECHNICAL FIELD

The present invention pertains to a process and a device, with which the acoustic characteristic of an exhaust gas flap for an exhaust system of an internal combustion engine can be analyzed. Exhaust gas flaps are installed in exhaust systems of vehicles in order to be able to influence the acoustic characteristic of the exhaust system in a targeted manner. For this purpose, such exhaust gas flaps have a generally tubular flap body, which is integrated into an exhaust system. A flap diaphragm is carried pivotably in the flap body between a closed position and a released position. The acoustic transparency of the exhaust gas flap can be influenced by pivoting the flap diaphragm.

BACKGROUND

Flow noises, which are generally perceived as disturbing noises, may occur due to leaks present in a structure-related manner during the flow around the flap diaphragm, and especially in the closed state of same. Such flow noises may develop, in principle, in a structure-related manner, on the one hand, but may also be caused by production tolerances or/and assembly errors occurring during the production of exhaust gas flaps, on the other hand.

In order to be able to evaluate the acoustic quality of exhaust gas flaps, it is possible, for example, to proceed such that a vehicle equipped with an exhaust gas flap or an exhaust system connected to an internal combustion engine is tested acoustically in a test bench. In order to be able to analyze different flaps in this case, it is necessary to disassemble and to reassemble the exhaust system for each exhaust gas flap to be tested, which is time-consuming, on the one hand, and involves the risk of errors occurring during the assembly and thus influencing the development of disturbing noises, on the other hand.

SUMMARY OF THE INVENTION

An object of the present invention is to provide a process and a device for the analysis of the acoustic characteristic of an exhaust gas flap for an exhaust system of an internal combustion engine, especially of a vehicle, with which information about the acoustic quality of an exhaust gas flap can be provided in a simple and reliable manner.

According to a first aspect of the present invention, this object is accomplished by a process for the analysis of the acoustic characteristic of an exhaust gas flap for an exhaust system of an internal combustion engine, wherein the exhaust gas flap comprises a flap diaphragm, which is adjustable in a flap body, wherein the process comprises the following steps:

a) application of a measurement noise to the exhaust gas flap,
b) detection of disturbing noises originating at the exhaust gas flap and generation of a disturbing noise time course,
c) generation of a disturbing noise frequency course based on the disturbing noise time course,
d) comparison of the disturbing noise frequency course with a reference disturbing noise frequency course, and
e) evaluation of the acoustic quality of the exhaust gas flap based on the comparison carried out in step d).

In the configuration according to the present invention, a measurement noise preset in a defined manner is applied to an exhaust gas flap to be analyzed. This means that the exhaust gas flap does not, in principle, have to be integrated into an exhaust system connected to an internal combustion engine, but rather can be analyzed detached from the exhaust system and with a measurement noise applied. This provides analysis results, which are clear and reproducible and thus also comparable to one another. Furthermore, since a comparison is carried out with a reference disturbing frequency course preset in a defined manner, the reference situation is also clearly preset, so that the validity of the analysis results is further improved. The repeated assembly and disassembly of an exhaust system connected to an internal combustion engine or integrated into a vehicle is no longer required in the procedure according to the present invention. The exhaust system may therefore be directly inserted after the production process or be integrated into the development process. In principle, the procedure according to the present invention may, however, also be carried out in conjunction with an exhaust system that is fully constructed and analyzed according to the principles of the present invention.

For a configuration which is fast to carry out and leads to measurement results that can be compared to one another, it is provided that step a) comprise the integration of the exhaust gas flap into an analysis device, wherein the analysis device comprises a sound feed duct area to be positioned in a sound flow direction upstream of the flap body adjoining this flap body and a sound removal duct area to be positioned in a sound flow direction downstream of the flap body adjoining this flap body, as well as a measurement noise source for generating the measurement noise to be sent via the sound feed duct area to the exhaust gas flap.

The measurement noise which is applied to an exhaust gas flap to be analyzed is preferably a single tone, which has, for example, a frequency less than/equal to 40 Hz, preferably in the range of 20 Hz to 40 Hz.

The disturbing noise frequency course may be generated in step c) by Fourier analysis, preferably fast Fourier transformation.

Because both the disturbing noise frequency course and the reference disturbing noise frequency course can be considered at least in a defined frequency range as courses approximately rendered by a curve or at least enveloped, the quality of the exhaust gas flap can be correspondingly evaluated as a desired quality in step e) if the disturbing noise frequency course is below the reference disturbing noise frequency course in at least one predetermined frequency range. This means that the amplitude is smaller in the disturbing noise frequency course than in the reference disturbing noise frequency course in the frequency range considered for all frequency components represented there.

In order to be able to provide a reliable basis for the comparison of the disturbing noise frequency course with the reference disturbing noise frequency course, it is provided that the reference disturbing noise frequency course be determined on the basis of disturbing noise frequency courses generated in association with a plurality of exhaust gas flaps, or/and that the reference disturbing noise frequency course compared with the disturbing noise frequency course in step d) be selected in association with a measurement noise generated in step a).

According to another aspect, the object specified in the introduction is accomplished by a device for the analysis of the acoustic characteristic of an exhaust gas flap for an exhaust system of an internal combustion engine, especially with a process according to the present invention, the exhaust gas flap comprising a flap diaphragm, which is adjustable in a flap body, the device comprising:

- a sound feed duct area to be positioned in a sound flow direction upstream of the flap body adjoining this flap body,
- a sound removal duct area to be positioned in a sound flow direction downstream of the flap body adjoining this flap body or/and provided by this flap body,
- at least one measurement noise source for the generation of a measurement noise to be sent via the sound feed duct area to the exhaust gas flap,
- at least one noise sensor for the detection of disturbing noises sent along the sound removal duct area,
- an actuating unit for the actuation of the at least one measurement noise source for the generation of a measurement noise, and
- an analysis device for the receipt of an output signal of the at least one noise sensor, which output signal represents a disturbing noise time course, wherein the analysis device is configured to generate a disturbing noise frequency course based on the disturbing noise time course and to compare the disturbing noise frequency course with a reference disturbing noise frequency course.

In order to be able to preset different analysis situations with such a device, and especially also to be able to test or analyze the exhaust gas flaps to be integrated into different exhaust systems, it is further provided that the actuating unit be configured to actuate the at least one measurement noise source for the generation of different measurement noises.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
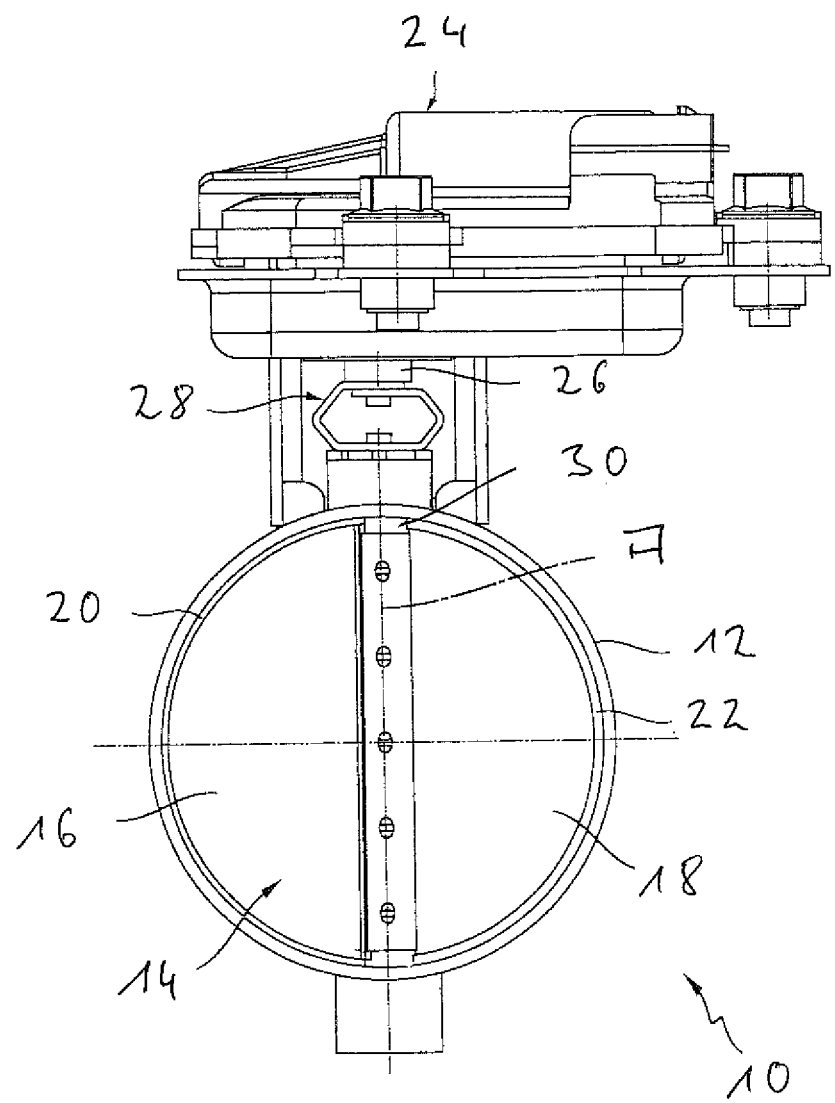
FIG. 1 is an end view of an exhaust gas flap that can be inserted in an exhaust system of an internal combustion engine of a vehicle.

Referring to the drawings, an exhaust gas flap that can be inserted in an exhaust system of an internal combustion engine in a vehicle is generally designated by 10 in FIG. 1. The exhaust gas flap 10 comprises a tubular flap body 12, in which a flap diaphragm 14 with two flap wings 16, 18 is pivotably carried about a pivot axis A. Stops 20, 22 fixed to the flap body 12, with which the flap wings 16, 18 come into contact in the closed position shown in FIG. 1, are provided in association with the two flap wings 16, 18. The flap diaphragm 14 is located in a flap diaphragm open position during pivoting about the pivot axis A by approximately 90°.

An electric motor pivot drive, which is generally designated by 24, is provided for pivoting the flap diaphragm 14 about the pivot axis A. A drive shaft 26 of the pivot drive 24 is coupled via a coupling element 28 to a pivot shaft 30 of the flap diaphragm 14, which pivot shaft carries the two flap wings 16, 18.

How such an exhaust gas flap 10 can be analyzed with regard to its acoustic characteristic will be explained in detail below with reference to FIGS. 2 and 3. For this acoustic characteristic, it is particularly important that even in the closed position of the flap diaphragm 14 shown in FIG. 1, unavoidable leak flows occur between the outer circumference of the flap wings 16, 18 and the inner circumference of the flap body 12, especially in those areas, in which the flap wings 16, 18 are connected to the pivot shaft 30 in their outer circumference area. Because of the intermittent emission of exhaust gas of an internal combustion engine and thus the exhaust gas impinging on the flap diaphragm 14 in a pulsating manner, this leads to disturbing noises which can be perceived clearly in the interior of a vehicle and especially also in the outer area of a vehicle. A reproducible and comparable analysis of the acoustic characteristic of such an exhaust gas flap 10 shall be made possible with the device and process described below.

Figure 2:
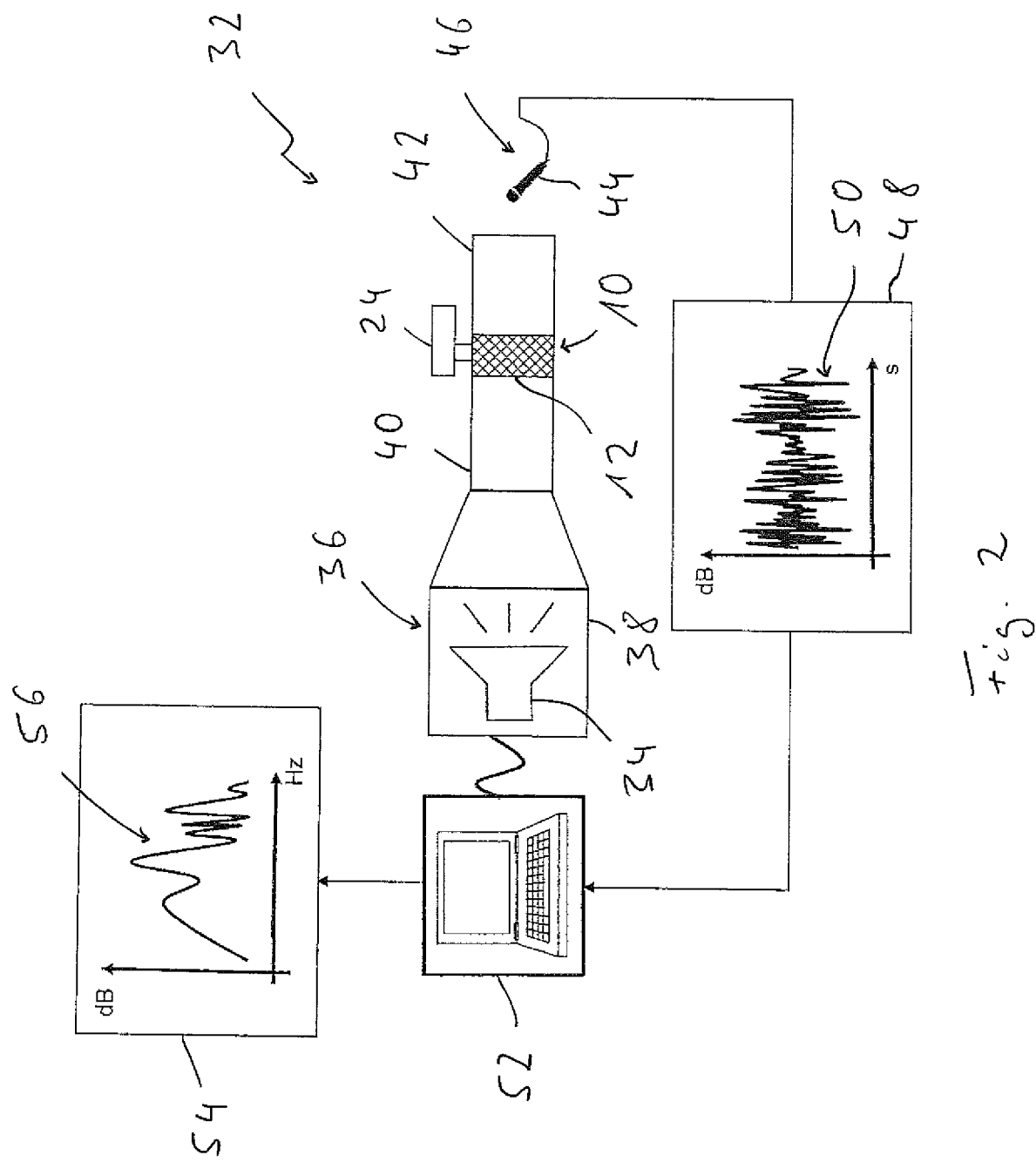
FIG. 2 is a schematic view of a device for the analysis of the acoustic characteristic of an exhaust gas flap and the mode of operation thereof.

FIG. 2 shows in a schematic diagram a device 32, with which the acoustic characteristic of an exhaust gas flap 10 can be analyzed. The device 32 comprises a measurement noise source 36, which is configured, for example, as a loudspeaker 34, as an essential component. This loudspeaker 34 is arranged in a housing 38, which is open towards a sound feed duct area 40, which has, for example, a tubular configuration. A sound removal duct area 42, which likewise has, for example, a tubular configuration, is arranged following the sound feed area 40 in a sound flow direction. The exhaust gas flap 10 is inserted between the sound feed duct area 40 and the sound removal duct area 42. For this, the sound feed duct area 40 and the sound removal duct area 42 may have a mutual distance, which corresponds to the length of the flap body 12, so that the flap body 12 can be arranged essentially without play between the sound feed duct area 40 and the sound removal duct area 42. In order to create an especially also acoustically sealed arrangement, elastic sealing elements are inserted in the adjoining area of the flap body 12 at the sound feed duct area 40 and the sound removal duct area 42. Further, positioning means may be provided, with which the exhaust gas flap 10 is held, for example, by clamping elements between the sound feed duct area 40 and the sound removal duct area 42.

A noise sensor 46 configured, for example, in the form of a microphone 44 is provided at an open end of the sound removal duct area 42, which end is located at a distance from the exhaust gas flap 10. The noise sensor 46 detects the sound being released from the sound removal duct area 42 and generates a disturbing noise time course 50 shown in FIG. 2 on the basis of a diagram 48. This disturbing noise time course 50 may represent, for example, the noise level plotted over time or occurring over time. In case of a tubular configuration of the flap body 12, the sound removal duct area may, as an alternative, be provided by the part of the flap body 12 located in the sound flow direction downstream of the flap diaphragm 14, so that the microphone 44 can be positioned, for example, directly adjoining the flap body 12 and thus closer to the flap body 12. In this sense, the flap body 12 with its part located downstream of the flap diaphragm 14 thus itself forms a part of the device 32.

The signal outputted by the noise sensor 46, i.e., the disturbing noise time course, is inputted into an actuating/analysis unit 52. The actuating/analysis unit 52 is configured to receive the signal from the noise sensor 46 and to process this in the manner described below. The actuating/analysis unit 52 is further configured to actuate the noise source 36 such that this noise source emits a defined noise. For this purpose, the actuating/analysis unit 52 may be configured with a programmable microprocessor and storage media, i.e., configured, for example, as a computer system, which, on the one hand, makes it possible for an operator to enter data, and, on the other hand, can display the analysis result visually or provide it in file form.

To carry out an acoustic analysis of an exhaust gas flap 10 to be tested, after the exhaust gas flap 10 has been positioned between the sound feed duct area 40 and the sound removal duct area 42, the noise source 36 is actuated by the actuating/analyzing unit 52 for the generation of a defined noise. This noise may be selected, for example, as a function of the exhaust gas flap 10 to be analyzed or/and as a function of an operating state of the exhaust gas flap 10, which operating state is to be simulated, or/and as a function of an internal combustion engine exhaust system to be simulated and may be, for example, a low-frequency single tone with a frequency in the range of about 30 Hz to 40 Hz. For the analysis, the exhaust gas flap 10 is brought into a defined operating state, for example, an operating state, in which the flap wings 16, 18 of the flap diaphragm 14 are in contact with the stops 20, 22 associated with each of them. Due to the low-frequency noise generated by the noise source 36, the air column is set into vibration upstream of the exhaust gas flap 10, i.e., especially in the sound feed duct area 40, as a result of which the pulsating application of the exhaust gas flap 10 generated during the combustion operation of an internal combustion engine is simulated. Because of this excitation, air flows through the intermediate spaces present between the flap diaphragm 14 and the flap body 12 and thereby generates flow noises, which are generally to be considered to be disturbing noises. These flow noises or disturbing noises are picked up by the noise sensor 46, i.e., the microphone 44, and sent in the form of the disturbing noise time course 50 as a detection signal to the actuating/analyzing unit 52.

Analysis of the disturbing noise time course 50 takes place in the actuating/analyzing unit 52. For this purpose, first the disturbing noise time course 50 is transformed, for example, by fast Fourier transformation, into a disturbing noise frequency course 56 shown in the diagram 54.

Figure 3:
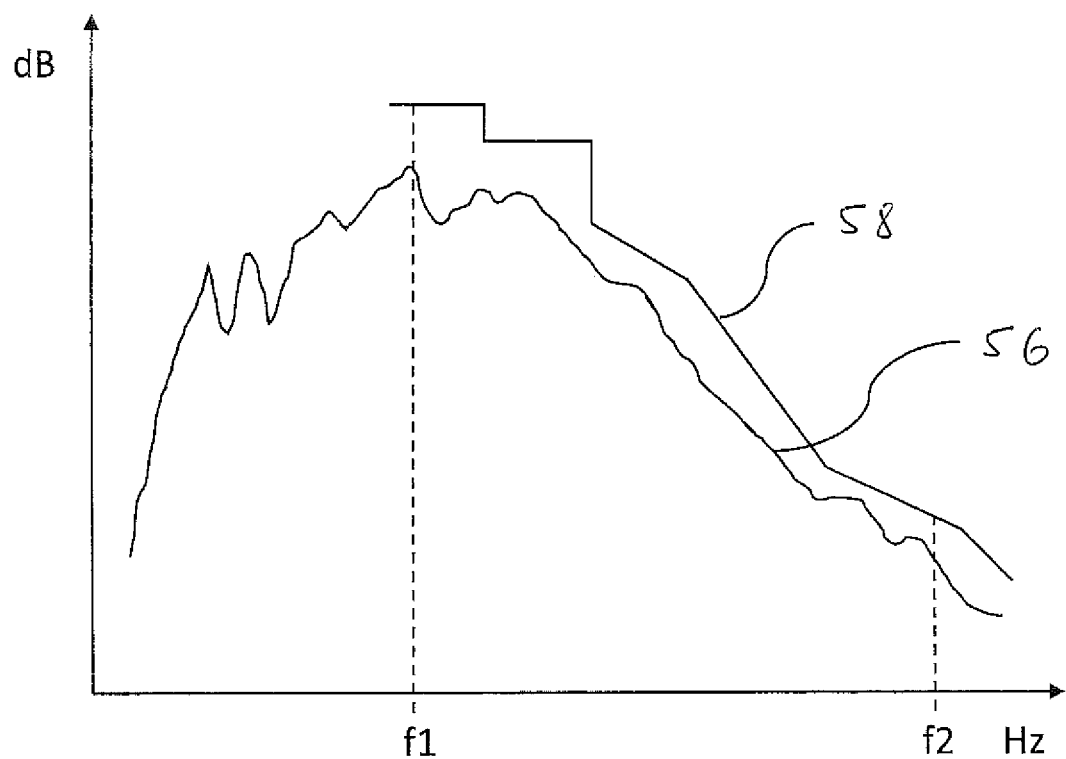
FIG. 3 is a schematic diagram of a disturbing noise frequency course and an associated reference disturbing noise frequency course.

Such a disturbing noise frequency course 56 is also shown in FIG. 3. This represents a frequency spectrum, in which an amplitude represents the magnitude of the frequency component in the white noise occurring as disturbing noise, i.e., broad-band in the frequency spectrum in association with each frequency value contained therein. The disturbing noise frequency course 56 may be reproduced as an essentially continuous or quasi-continuous curve, but may also be represented by a plurality of discrete frequency values each with associated amplitudes.

A reference disturbing noise frequency course 58 is stored in the actuating/analyzing unit 52 in association with the disturbing noise frequency course 56. The reference disturbing noise frequency course may be based, for example, on a mean value, which is generated from disturbing noise frequency courses of a plurality of other exhaust gas flaps, the disturbing noises of which were evaluated, in principle, as acceptable. Thus, the reference disturbing noise frequency course defines an upper limit for the amplitude of the frequency components located in this frequency range for the frequency range to be tested, which may be, for example, between the frequencies f1 and f2 in the diagram in FIG. 3 and may comprise a frequency spectrum of, e.g., 20 Hz to 20,000 Hz. In this connection, the specified frequency range is especially adapted to the frequencies perceptible by the human ear. Frequencies outside of this range perceptible by the human ear are generally uncritical.

It is seen in FIG. 3 that the disturbing noise frequency course 56 shown there only as an example is below the reference disturbing noise frequency course 58 in the entire frequency range f1 through f2 tested. This means that the associated amplitude of the disturbing noise frequency course 56 is below the corresponding amplitude of the reference disturbing noise frequency course in each frequency in the frequency range f1 through f2 tested. The associated exhaust gas flap 10 will in this case be correspondingly evaluated as a desired quality. If the disturbing noise frequency course 56 were above the reference disturbing noise frequency noise 5 58 in some areas, then it could be evaluated, for example, that the exhaust gas flap analyzed does not correspond to the preset quality criteria.

The above-described analysis can be carried out for different operating positions of a particular exhaust gas flap 10 and can be carried out using different measurement noises. Different operating situations may thus be simulated in order to analyze in which operating situations an exhaust gas flap 10 tested correspondingly complies with preset requirements or shows unacceptable deviations.

The acoustic characteristic of an exhaust gas flap can be automated and be analyzed in a very short time in the manner described above and thus it is possible to decide whether an exhaust gas flap corresponds to the preset quality requirements and can be used in the further production process or not. Such an analysis may be provided, for example, at the end of the production line for exhaust gas flaps, but may also be carried out after the integration of the exhaust gas flaps into a respective exhaust system. The analysis may be carried out with minimal personnel expenditure and because of the use of defined measurement noises and defined reference disturbing noise frequency courses, offers the opportunity to provide analysis results which are reproducible and readily comparable to one another. In this way, several hundred exhaust gas flaps may be analyzed during a measuring time of less than 10 sec per exhaust gas flap during each work shift. It is readily possible in this case to change between exhaust gas flaps of different design during the analysis, since, for example, only a different measurement noise and a different reference disturbing noise frequency course in association with a respectively analyzed exhaust gas flap have to be selected for this.

While specific embodiments of the invention have been shown and described in detail to illustrate the application of the principles of the invention, it will be understood that the invention may be embodied otherwise without departing from such principles.

What is claimed is:

1. A process for the analysis of an acoustic characteristic of an exhaust gas flap for an exhaust system of an internal combustion engine, wherein the exhaust gas flap comprises a flap diaphragm and a flap body wherein the flap diaphragm is adjustable in the flap body, the process comprising the steps of:

applying a measurement noise to the exhaust gas flap, wherein the measurement noise is a single tone;

detecting disturbing noises originating at the exhaust gas flap and generating a disturbing noise time course;

generating a disturbing noise frequency course based on the disturbing noise time course;

comparing the disturbing noise frequency course with a reference disturbing noise frequency course in at least one predetermined frequency range; and evaluating of the acoustic characteristic of the exhaust gas flap based on the comparison, wherein a quality of the exhaust gas flap is evaluated as a desired quality, when the disturbing noise frequency course is below the reference disturbing noise frequency course in at least one predetermined frequency range.

2. A process in accordance with claim 1, wherein the step of applying a measurement noise to the exhaust gas flap comprises:

integrating the exhaust gas flap into an analysis device;

providing the analysis device, wherein the analysis device comprises:

a sound feed duct area to be positioned in a sound flow direction upstream of the flap body adjoining the flap body;

a sound removal duct area to be positioned in a sound flow direction downstream of the flap body adjoining the flap body; and a measurement noise source for generating the measurement noise to be sent via the sound feed duct area to the exhaust gas flap.

3. A process in accordance with claim 1, wherein:

the measurement noise has a frequency less than/equal to 40 Hz; or the measurement noise has a frequency in the range of 20 Hz to 40 Hz.

4. A process in accordance with claim 1, wherein the disturbing noise frequency course is generated by means of Fourier analysis comprising fast Fourier transformation.

5. A process in accordance with claim 1, wherein:

the reference disturbing noise frequency course is determined on the basis of disturbing noise frequency courses generated in association with a plurality of exhaust gas flaps; or the reference disturbing noise frequency course is selected in association with a measurement noise generated for the step of applying a measurement noise to the exhaust gas flap.

6. A device for the analysis of an acoustic characteristic of an exhaust gas flap for an exhaust system of an internal combustion engine, wherein the exhaust gas flap comprises a flap diaphragm, which is adjustable in a flap body, the device comprising:

a sound feed duct area to be positioned in a sound flow direction upstream of the flap body adjoining the flap body;

a sound removal duct area to be positioned in a sound flow direction downstream of the flap body adjoining the flap body or/and provided by the flap body;

at least one measurement noise source configured to generate a single tone measurement noise to be sent via the sound feed duct area to the exhaust gas flap;

at least one noise sensor for the detection of disturbing noises sent along the sound removal duct area;

an actuating unit for an actuation of the at least one measurement noise source for the generation of a measurement noise; and an analysis device for the receipt of an output signal of the at least one noise sensor, which output signal represents a disturbing noise time course, wherein the analysis device is configured to generate a disturbing noise frequency course based on the disturbing noise time course and to compare the disturbing noise frequency course with a reference disturbing noise frequency course in at least one predetermined frequency range and to evaluate the acoustic characteristic of the exhaust gas flap based on the comparison.

7. A device in accordance with claim 6, wherein the actuating unit is configured to actuate the at least one measurement noise source for the generation of different measurement noises.

8. A device in accordance with claim 6, wherein:

the measurement noise has a frequency less than/equal to 40 Hz; or the measurement noise has a frequency in the range of 20 Hz to 40 Hz.

9. A device in accordance with claim 6, wherein the disturbing noise frequency course is generated by means of Fourier analysis comprising fast Fourier transformation.

10. A device in accordance with claim 6, wherein the analysis device is further configured to evaluate a quality of the exhaust gas flap as a desired quality, when the disturbing noise frequency course is below the reference disturbing noise frequency course in at least one predetermined frequency range.

11. A device in accordance with claim 6, wherein:

the analysis device is further configured to determine the reference disturbing noise frequency course on the basis of disturbing noise frequency courses generated in association with a plurality of exhaust gas flaps; or the analysis device is further configured to select the reference disturbing noise frequency course in association with a measurement noise generated for the step of applying a measurement noise to the exhaust gas flap.

12. A process for the analysis of an acoustic characteristic of an exhaust gas flap for an exhaust system of an internal combustion engine, the process comprising the steps of:

providing an exhaust gas flap structure comprising a flap diaphragm and a flap body, wherein the flap diaphragm is adjustable in the flap body, the exhaust gas flap structure comprising an exhaust gas flap structure acoustic quality;

applying a single tone measurement noise to the exhaust gas flap structure;

detecting disturbing noises generated by the exhaust gas flap structure and generating a disturbing noise time course based on the disturbing noises generated by the exhaust gas flap structure;

generating a disturbing noise frequency course based on the disturbing noise time course;

comparing the disturbing noise frequency course with a reference disturbing noise frequency course in at least one predetermined frequency range;

evaluating the acoustic characteristic of the exhaust gas flap structure based on the comparison;

determining the exhaust gas flap structure acoustic quality as a desired acoustic quality when the disturbing noise frequency course is below the reference disturbing noise frequency course in at least one predetermined frequency range.

13. A process in accordance with claim 12, wherein the step of applying a measurement noise to the exhaust gas flap structure comprises:
   integrating the exhaust gas flap structure into an analysis device;
   providing the analysis device, wherein the analysis device comprises:
   a sound feed duct area to be positioned in a sound flow direction upstream of the flap body adjoining the flap body;
   a sound removal duct area to be positioned in a sound flow direction downstream of the flap body adjoining the flap body; and
   a measurement noise source for generating the measurement noise to be sent via the sound feed duct area to the exhaust gas flap structure.

14. A process in accordance with claim 12, wherein:
   the measurement noise has a frequency less than/equal to 40 Hz; or
   the measurement noise has a frequency in the range of 20 Hz to 40 Hz.

15. A process in accordance with claim 12, wherein the disturbing noise frequency course is generated by means of Fourier analysis comprising fast Fourier transformation.

16. A process in accordance with claim 12, wherein:
   the reference disturbing noise frequency course is determined on the basis of disturbing noise frequency courses generated in association with a plurality of exhaust gas flap structures; or
   the reference disturbing noise frequency course is selected in association with a measurement noise generated for the step of applying a measurement noise to the exhaust gas flap structure.

* * * * *